US012711234B2

(12) United States Patent
Kaiser et al.

(10) Patent No.: US 12,711,234 B2
(45) Date of Patent: Aug. 18, 2026

(54) GENERATING AUDIT RECORDS FOR DISTRIBUTED COMPUTING SYSTEM-BASED MOTOR VEHICLE

(71) Applicant: HEWLETT PACKARD ENTERPRISE DEVELOPMENT LP, Houston, TX (US)

(72) Inventors: Sebastian Kaiser, Ratingen (DE); Florian Buehr, Boeblingen (DE); Stefan Brock, Schwalbach am Taunus (DE); Nigel J. Edwards, Bristol (GB)

(73) Assignee: Hewlett Packard Enterprise Development LP, Spring, TX (US)

(*) Notice: Subject to any disclaimer, the term of this patent is extended or adjusted under 35 U.S.C. 154(b) by 701 days.

(21) Appl. No.: 17/936,039

(22) Filed: Sep. 28, 2022

(65) Prior Publication Data

US 2024/0104211 A1 Mar. 28, 2024

(51) Int. Cl.
*G06F 21/57* (2013.01)
*G06F 11/267* (2006.01)
*G06F 11/273* (2006.01)

(52) U.S. Cl.
CPC ............ *G06F 21/57* (2013.01); *G06F 11/267* (2013.01); *G06F 11/273* (2013.01)

(58) Field of Classification Search
CPC ........ G06F 21/57; G06F 11/267; G06F 11/26; G06F 11/273
See application file for complete search history.

(56) References Cited

U.S. PATENT DOCUMENTS 9,667,427 B2 5/2017 Oberhauser et al.
10,579,800 B2 3/2020 Blundell
(Continued)

FOREIGN PATENT DOCUMENTS

WO WO2020205514 10/2020

*Primary Examiner* — Phy Anh T Vu
(74) *Attorney, Agent, or Firm* — Trop, Pruner & Hu, P.C.

(57) ABSTRACT

A process includes testing a motor vehicle using a distributed computing system. The distributed computing system includes a plurality of hardware components and a plurality of software components. The plurality of hardware components includes first hardware components of the vehicle and second hardware components that are separate from the vehicle. The plurality of software components includes first software components of the vehicle and second software components separate from the vehicle. The process includes, responsive to the testing, generating, by the distributed computing system, an audit record. Generating the audit record includes determining, by the distributed computing system, integrity measurements of the first hardware components, the second hardware components, the first software components and the second software components. Generating the audit record further includes comparing, by the distributed computing system, the integrity measurements to reference measurements that correspond to reference hardware configuration for the distributed computing system and a reference software configuration for the distributed computing system. Generating the audit record includes providing, by the distributed computing system, responsive to the comparison, digitally signed data for the audit record attesting to the distributed computing system having the reference hardware configuration and the reference software configuration in connection with the testing.

21 Claims, 9 Drawing Sheets

(56) References Cited

U.S. PATENT DOCUMENTS

2011/0137955 A1* 6/2011 Sul .......................... H04L 43/50
707/E17.044
2011/0138188 A1* 6/2011 Lee ......................... G06F 21/57
713/187
2013/0311032 A1* 11/2013 Shelcusky .............. G07C 5/008
701/29.1
2016/0283361 A1* 9/2016 Alexander .......... G06F 11/3698
2017/0132118 A1* 5/2017 Stefan ................... B60W 50/04
2019/0095302 A1* 3/2019 Wang .................. G06F 11/0739
2019/0141074 A1* 5/2019 Oka ........................ H04L 43/50
2019/0303759 A1* 10/2019 Farabet .................. G06N 3/063
2019/0312855 A1* 10/2019 Sharma ................... G06F 16/27
2019/0384918 A1* 12/2019 Ndu ...................... G06F 21/575
2020/0034839 A1 1/2020 Soundararajan et al.
2020/0034876 A1 1/2020 Soundararajan et al.
2020/0036533 A1 1/2020 Soundararajan et al.
2020/0036712 A1 1/2020 Soundararajan et al.
2020/0037158 A1 1/2020 Soundararajan et al.
2020/0145214 A1 5/2020 Linton et al.
2021/0218720 A1 7/2021 Oberhauser et al.
2022/0136930 A1* 5/2022 Zhao ................. G01M 17/0072
701/32.8
2024/0103855 A1* 3/2024 Engel ........................ G06F 8/71
2024/0123615 A1* 4/2024 Whiteside ........... G06F 11/3692
2024/0370360 A1* 11/2024 Chandler ............... G06N 5/013
2025/0328701 A1* 10/2025 Darling ..................... G06F 8/33

* cited by examiner

TEST MOTOR VEHICLE USING DISTRIBUTED COMPUTING SYSTEM, WHERE DISTRIBUTED COMPUTING SYSTEM INCLUDES PLURALITY OF HARDWARE COMPONENTS AND PLURALITY OF SOFTWARE COMPONENTS, PLURALITY OF HARDWARE COMPONENTS INCLUDES FIRST HARDWARE COMPONENTS OF MOTOR VEHICLE AND SECOND HARDWARE COMPONENTS SEPARATE FROM MOTOR VEHICLE, AND PLURALITY OF SOFTWARE COMPONENTS INCLUDES FIRST SOFTWARE COMPONENTS OF VEHICLE AND SECOND SOFTWARE COMPONENTS SEPARATE FROM VEHICLE

604

RESPONSIVE TO TESTING, GENERATE, BY DISTRIBUTED COMPUTING SYSTEM, AT LEAST ONE AUDIT RECORD, WHERE GENERATING AUDIT RECORD(S) INCLUDES:

- DETERMINING, BY DISTRIBUTED COMPUTING SYSTEM, INTEGRITY MEASUREMENTS OF FIRST HARDWARE COMPONENTS, SECOND HARDWARE COMPONENTS, FIRST SOFTWARE COMPONENTS AND SECOND SOFTWARE COMPONENTS
- COMPARING, BY DISTRIBUTED COMPUTING SYSTEM, INTEGRITY MEASUREMENTS TO REFERENCE MEASUREMENTS CORRESPONDING TO REFERENCE HARDWARE CONFIGURATION FOR DISTRIBUTED COMPUTING SYSTEM AND REFERENCE SOFTWARE CONFIGURATION FOR DISTRIBUTED COMPUTING SYSTEM
- PROVIDING, BY DISTRIBUTED COMPUTING SYSTEM, RESPONSIVE TO COMPARISON, DIGITALLY SIGNED DATA FOR AUDIT RECORD(S) ATTESTING TO DISTRIBUTED COMPUTING SYSTEM HAVING REFERENCE HARDWARE CONFIGURATION AND REFERENCE SOFTWARE CONFIGURATION IN CONNECTION WITH TESTING

FIG. 6

GENERATING AUDIT RECORDS FOR DISTRIBUTED COMPUTING SYSTEM-BASED MOTOR VEHICLE

BACKGROUND

The design and development of a motor vehicle may involve a number of tests before homologation and even before serial production of the motor vehicle. The tests may involve performing different driving and crash scenarios to test a motor vehicle design and its variants with a wide range of possible vehicle configurations.

BRIEF DESCRIPTION OF THE DRAWINGS

FIG. 6 is a flow diagram depicting a process to test a motor vehicle using a distributed computing system and create at least one audit record for the test according to an example implementation.

DETAILED DESCRIPTION

Figure 1A:
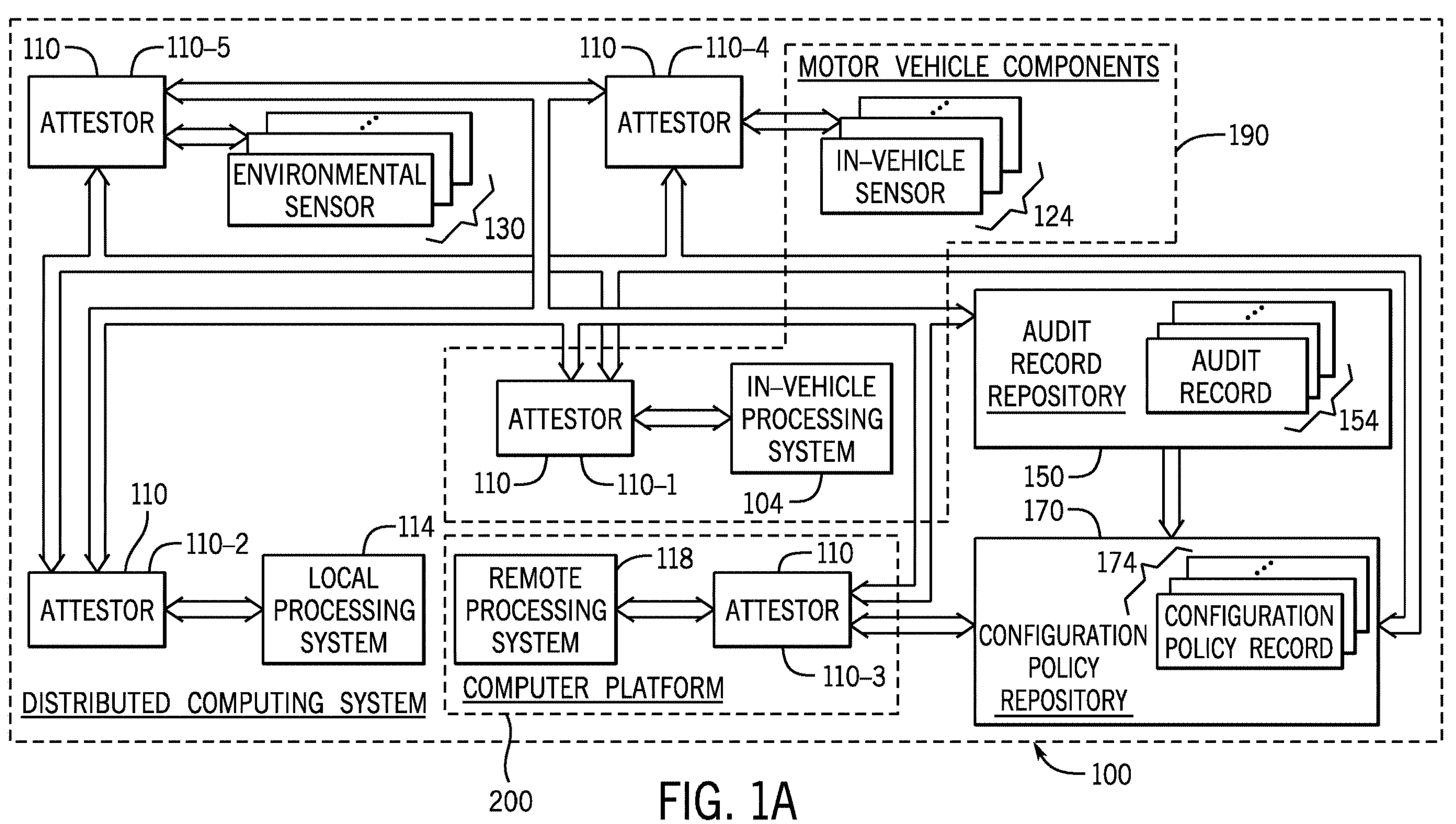
FIG. 1A is a block diagram of a distributed computing system associated with a motor vehicle test according to an example implementation.

Motor vehicle tests may take on many different forms. For example, a motor vehicle, in one its various lifecycle stages (e.g., an early prototype, an intermediate stage or the final production model) may be subject to an actual physical test, such as a driving, braking or crash test. The physical test may present a number of different scenarios to test different configuration of the motor vehicle. As another example of a motor vehicle test, a particular motor vehicle subsystem (e.g., a braking subsystem, an autonomous driving subsystem or a safety subsystem) may be tested in a process that involves one or multiple simulations. For example, a hardware-in-loop (HIL) test may be used to test functions of an electronic control unit (ECU) of the motor vehicle with one or multiple simulated subsystems or components of the vehicle that interact with the ECU. The ECU may be, for example, part of a safety subsystem (e.g., an antilock braking system (ABS), stability control system, traction control system, cross-traffic awareness system, a lane departure warning system, or other safety system) or part of an autonomous control system (e.g., an autonomous braking control subsystem or autonomous steering control subsystem) of the motor vehicle.

In the context used herein, a "motor vehicle test" (also referred to as a "test of a motor vehicle" herein) refers to one or multiple operations being performed to evaluate one or multiple functions of a motor vehicle in any of its lifecycle stages (e.g., a planning stage, an analysis stage, a design stage, an implementation stage or a maintenance stage). A given motor vehicle test may involve evaluating one or multiple functions of one or multiple components or subsystems of a motor vehicle. Moreover, a motor vehicle test may involve actual physical testing of a motor vehicle or its variants, and a motor vehicle test may include simulating one or multiple components or subsystems of the motor vehicle. In this context, "simulating" (or "performing a simulation") a component or subsystem refers to emulating one or multiple responses of the component(s) or subsystem(s) using one or multiple mathematical models. A simulation may include, for example, executing machine-readable instructions (e.g., software) on a processing system to provide and use one or multiple mathematical model(s) that emulate response(s) of the component(s) or subsystem(s).

A motor vehicle test, in accordance with example implementations, may include one or multiple integration, verification and validation (IVV) processes, such as the IVV processes that are described in International Organization Standard (ISO)/International Electrotechnical Commission (IEC)/Institute of Electrical and Electronics Engineers (IEEE) 15288 (2015).

A motor vehicle test may involve the use of a distributed computing system. In this context, a "distributed computing system" refers to a system of multiple independent processing systems that cooperate to perform one or multiple tasks, such as the tasks that are part of a motor vehicle test. In the context used herein, a "processing system" refers to an electronic device that includes one or multiple hardware processors (e.g., central processing unit (CPU) cores, graphics processing units (GPUs) or multi-core semiconductor packages, or "sockets") that execute machine-readable instructions (e.g., firmware and/or software). In the context used herein, an "independent" processing system refers to a processing system that has an independent operating system (e.g., a Linux operating system, a hypervisor or other operating system).

In accordance with example implementations, a distributed computing system may include independent processing systems that communicate using private and public network fabric. In accordance with further implementations, a distributed computing system may include independent processing systems that solely communicate using public network fabric.

In accordance with example implementations, the independent processing systems of a distributed computing system may or may not be geographically distributed. For example, for a particular motor vehicle test, a distributed computing system may include an in-vehicle processing system (e.g., a system corresponding to one or multiple ECUs and associated sensors) of a motor vehicle located at a test site; a local processing system (e.g., a laptop computer or smartphone) located at the test site; and a cloud-based processing system that includes equipment located at one or multiple remote data centers that are located at locations other than the test site. As another example, a particular motor vehicle test may solely include processing systems that are local to the motor vehicle test site.

A distributed computing system, for a given motor vehicle test, has certain hardware and software configurations. In this manner, each independent processing system of the distributed computing system may have a particular hardware configuration and a particular software configuration for the motor vehicle test.

It is beneficial for an automotive company to create and maintain records that document the testing of a production motor vehicle for regulatory, warranty and liability purposes. For example, in the case of an accident, the records may provide evidence that engineering mistakes can be excluded as the cause of the accident. As another example, records may demonstrate compliance with a regulatory standard. Moreover, the records provide information to repeat, or recreate, a prior motor vehicle test at any time in the future for purposes of reassuring that the recreated test does indeed produce the same results as the prior motor vehicle test.

The documentation of motor vehicle tests may comply with specific regulations or industry standards. As an example, supporting process (SUP) 7 of the Automotive Software Process Improvement and Capability Determination (A-SPICE) Process Assessment/Reference Model Specification, Version 3.1 (Nov. 1, 2017), herein called the "A-SPICE Specification," defines criteria for documenting information that is produced by IVV processes. Acquisition process group (ACQ) 12 of the A-SPICE Specification specifies that the documentation is to comply with legal and administrative regulations.

It may be challenging to sufficiently document a motor vehicle test that involves the use of a distributed computing system, given that each independent processing system has its own particular hardware and software configurations. A manual documentation process (e.g., a process in which a human operator enters data into records describing the hardware and software configurations of the distributed computing system) may be prone to human error, and as such, the manual documentation process may raise concerns related to the integrity and the correctness of the recorded information. Moreover, there may be trustworthiness and accountability concerns about records that are produced by a manual documentation process.

In accordance with example implementations that are described herein, reference policy configuration records are used to define specific reference hardware and software configurations for a distributed computing system for a particular motor vehicle test. In accordance with example implementations, the distributed computing system is configured to verify whether, for purposes of the motor vehicle test, the distributed computing system complies with reference hardware and software configurations. The distributed computing system, in accordance with example implementations, generates and digitally signs one or multiple audit records that correspond to the motor vehicle test.

The audit records attest to system activity (e.g., system events) that occur during the motor vehicle test, and the audit records attest to whether or not actual hardware and software configurations of the distributed computing system comply with corresponding specified reference hardware and software configurations. Among the possible advantages, the combination of the reference policy configuration records and the digitally signed audit records provides a detailed, accurate and trustworthy way to document system configurations and system activities associated with the testing of a motor vehicle.

Referring to FIG. 1A, as a more specific example, a distributed computing system 100 may be used in connection with a motor vehicle test. Reference configurations (represented by reference configuration policy records 174) may be specified for the distributed computing system 100 for a given motor vehicle test. As further described herein, for a given motor vehicle test, the distributed computing system 100 verifies whether the distributed computing system 100 complies with the reference configurations, and the distributed computing system 100 generates one or multiple digitally signed audit records 154, which attest to the compliance verification results. In accordance with example implementations, the audit records 154 further document system activities that occurred during the motor vehicle test. Because each audit record 154 is digitally signed, any tampering with the audit record 154 is discoverable from the audit record 154 itself, as content of the audit record 154 is no longer consistent with its digital signature when tampering occurs.

In accordance with example implementations, the distributed computing system 100 includes independent processing systems that cooperate to perform a motor vehicle test. For the particular implementation that is depicted in FIG. 1A, the distributed computing system 100 includes one or multiple components 190 of a motor vehicle. As examples, these components 190 may include one or multiple in-vehicle sensors 124 (e.g., wheel speed sensors, radar sensors, sonar sensors, cameras, pressure sensors, temperature sensors, accelerometers as well as other and/or additional sensors). The components 190 may include an in-vehicle processing system 104. As an example, the in-vehicle processing system 104 may include one or multiple ECUs and may include one or multiple vehicle subsystems (e.g., a braking subsystem, an autonomous steering subsystem, an autonomous braking subsystem, a safety subsystem, or other subsystem). In accordance with some implementations, a given in-vehicle sensor 124 may include a processing system that includes one or multiple hardware processors. In accordance with some implementations, a given in-vehicle sensor 124 may not include a processing system.

In accordance with some implementations, all of the independent processing systems of the distributed computing system 100 may be located at a motor vehicle test site, and as such, for these implementations, all of the independent systems of the distributed computing system 100 may be considered "local" to one another. In accordance with further implementations, as depicted in FIG. 1A, the independent systems include both local systems and one or multiple systems that are "remote," or located at geographical locations other than the motor vehicle test site.

For the particular example implementation that is depicted in FIG. 1A, the distributed computing system 100 includes a local processing system 114. As an example, the local processing system 114 may be a computer platform (e.g., a laptop computer, a smartphone, a tablet, or other processing system). In accordance with example implementations, the distributed computing system 100 may include one or multiple other components that are not located in the motor vehicle and are considered to be local to the test site. For example, as depicted in FIG. 1A, the distributed computing system 100 may include one or multiple environmental sensors 130 (e.g., temperature sensors, road condition sensors, cameras, infrared sensors or other sensors). In accordance with some implementations, a given environmental sensor 130 may be a processing system. A given environmental sensor 130 may not be a processing system.

The distributed computing system 100, in accordance with example implementations, may include one or multiple processing systems that are remotely disposed with respect to the test site. FIG. 1A depicts an example remote processing system 118 of the distributed computing system 100, such as, for example, a cloud-based system that is provided by infrastructure that is located at a data center that is relatively remote, or located at a different geographical location than the motor vehicle test site. In accordance with some implementations, the remote processing system 118 may communicate with local processing systems of the distributed computing system 100 via public network fabric. In accordance with some implementations, the remote processing system 118 may be formed at least in part by a computer platform 200 that is discussed below in connection with FIG. 2.

In accordance with example implementations, a given motor vehicle test may be defined by one or multiple reference compute configuration policies, one or multiple reference software configuration policies and one or multiple reference data configuration policies. These policies may correspond to one or multiple reference configuration policy records 174. As depicted in FIG. 1A, the reference configuration policy records 174 may be stored in a configuration policy repository 170. In accordance with example implementations, hardware, software and data assets of the distributed computing system 100 have respective unique identifiers, which allows policies (e.g., attestation policies, reference compute configuration policies, reference software configuration policies, reference data configuration policies, protocol polices, and other policies) that are used in a motor vehicle test to be referenced via the identifiers.

A reference compute configuration policy, in accordance with example implementations, describes a particular compute infrastructure for a particular processing system of the distributed computing system 100. Here, a "compute infrastructure" refers to a specific set of resources that support the execution environment that is provided by the processing system. As examples, the resources may be hardware processors (e.g., CPU cores or graphics processing unit (GPU) cores), memories, storage devices, operating systems and system firmware.

In accordance with some implementations, for a given motor vehicle test, reference configuration policy records 174 specify reference compute infrastructures (and corresponding compute configuration policies) for respective processing systems of the distributed computing system 100. For this purpose, a reference compute configuration policy may specify one or multiple compute asset identifiers. As an example, for the remote processing system 118, a compute asset identifier may be one of the following: a specific system identifier identifying each node of the remote processing system 118 (e.g., an identifier corresponding to a trusted platform module (TPM) or virtual TPM (vTPTM)); an identifier for a specific operating system (e.g., a specific version of a Linux operating system or a specific image signature); an identifier for a specific Unified Extensible Firmware Interface (UEFI) (e.g., a specific UEFI version or a specific image signature); an identifier for a specific Basic Input/Output System (BIOS) (e.g., a specific BIOS version or image signature); an identifier for a specific system memory modules (e.g., a model number or memory type); an identifier for a specific CPU (e.g., a model number); or an identifier for another specific compute asset of the remote processing system 118. As another example, for the same motor vehicle test, a particular compute policy configuration for the environmental sensors 130 may specify a certain version of system firmware. As another example, a particular compute policy configuration for a given processing system may specify a platform model, platform serial number or compute node identifier.

A reference software configuration policy, in accordance with example implementations, refers to a description of a software infrastructure for a specific processing system of the distributed computing system 100. As examples, a particular reference software configuration policy may specify one or multiple of the following software asset identifiers for a given processing system: an application version; an application instance image hash; a container instance image hash; a virtual machine instance image hash, or other software infrastructure criteria.

A reference data configuration policy, in accordance with example implementations, specifies certain data sets to be associated with the motor vehicle test. In accordance with some implementations, for a given motor vehicle test, the reference configuration policy records 174 specify data asset identifiers for respective processing systems of the distributed computing system 100. For example, in accordance with some implementations, a particular reference data configuration policy may specify one or multiple data asset identifiers for a given processing system for many different types of data, such as initial condition data, environmental condition data, sensor calibration data, object data, driving condition data, device configuration data, motor vehicle option data, or other data associated with the motor vehicle test.

In accordance with example implementations, the distributed computing system 100 includes one or multiple attestors 110. In accordance with some implementations, the distributed computing system 100 includes an attestor 110 for each independent processing system. As depicted in FIG. 1A, in accordance with example implementations, the in-vehicle processing system 104, local processing system 114, remote processing system 118, in-vehicle sensors 124 and environmental sensors 130 are associated with attestors 110-1, 110-2, 110-3, 110-4 and 110-5, respectively.

In accordance with further implementations, a given attestor 110 may be associated with multiple processing systems of the distributed computing system 100. For example, in accordance with some implementations, the attestor 110-1 may be associated with the in-vehicle processing system 104 and the in-vehicle sensors 124.

In general, a given attestor 110, for a given motor vehicle test, verifies that its associated processing system complies with reference compute, software and data configurations for the processing system, as defined by one or multiple configuration policy records 174. For this purpose, the given attestor 110 may access the appropriate reference configuration policy records 174 from the configuration policy repository 170.

In accordance with some implementations, a reference configuration policy record 174 (e.g., a record setting forth a reference compute, software or data configuration) has an associated reference fingerprint. In accordance with example implementations, an attestor 110 may generate a fingerprint based on asset identities (e.g., compute asset identities for a reference compute configuration policy record 174) from the processing system and compare the fingerprint to the reference fingerprint to determine whether the processing system is compliant (the fingerprints match) or not (the fingerprints do not match). The attestor 110 may then, in accordance with example implementations, provide data for a corresponding audit record 154 indicating the determined compliance status. In accordance with example implementations, the attestor 110 may further include data in the audit record 154, which represents the system activity (e.g., event logs) during the motor vehicle test. The attestor 110 may digitally sign the audit record 154 and store the audit record 154 in an audit record repository 150 of the distributed computing system 100. As described further herein, if the attestor 110 determines that the associated processing system does not comply with the reference policy configuration, then the attestor 110 may take one or multiple responsive actions.

Figures 1B, 1C:
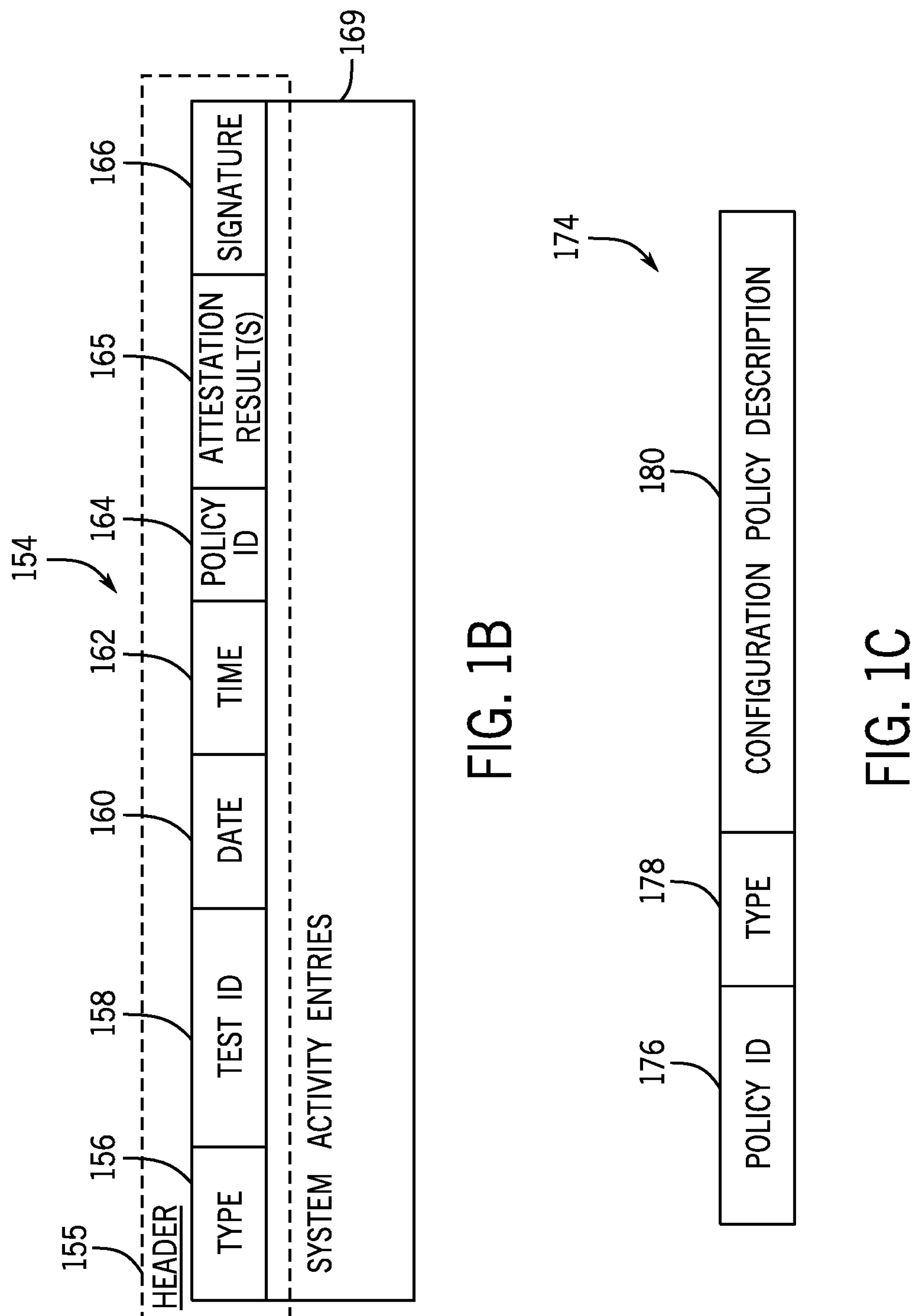
FIG. 1B illustrates an audit record that is generated by the distributed computing system of FIG. 1A according to an example implementation.
FIG. 1C illustrates a configuration policy record used to define a reference policy configuration for the motor vehicle test according to an example implementation.

FIG. 1B depicts the content of an audit record 154 in accordance with an example implementation. It is noted that FIG. 1B depicts one out of many possible implementations of the audit record 154. Regardless of its specific form, the audit record 154 contains digitally signed data to attest to the content of the audit record 154.

Referring to FIG. 1B in conjunction with FIG. 1A, for the example implementation that is depicted in FIG. 1B, the audit record 154 includes a header 155. The header 155 includes a field 156 that contains data representing a particular type for the audit record 154. For example, the type may indicate whether the audit record 154 corresponds to a reference compute, software or data configuration. The header 155 may further include, in accordance with example implementations, a field 158 that contains data that represents an identification, or "ID," of a specific motor vehicle test. Moreover, as depicted in FIG. 1B, in accordance with example implementations, the header 155 may include fields 160 and 162 that contain data representing a date and time, respectively, of the motor vehicle test. As depicted in FIG. 1B, in accordance with some implementations, the header 155 may include a field 164 that contains data that represents a policy ID, which identifies a particular configuration policy record 174 that describes the particular reference configuration.

In accordance with example implementations, the header 155 includes a field 165 that includes data that represents whether, as determined by the attestor, the processing system complied with the policy configuration record. In accordance with some implementations, the field 165 may contain data that represents, for each asset identifier of a specific set of asset identifiers, whether or not the asset identifier complied with the corresponding reference asset identifier. In accordance with some implementations, the data in the field 165 may represents the compliance or non-compliance for all of the asset identifiers associated with the configuration policy record. In accordance with some implementations, the data in the field 165 may represents the compliance or non-compliance for a selected subset of the asset identifiers associated with the configuration policy record. In accordance with some implementations, the data in the field 165 may represents whether or not all asset identifiers associated with the configuration policy record complied. In accordance with some implementations, the data in the field 165 may identify asset identifiers, which were determined not to comply.

As also depicted in FIG. 1B, the header 155 includes a field 166 that contains a digital signature, which relates to the trustworthiness of the audit record 154, as the digital signature may be used to determine whether or not tampering has occurred with the audit record 154. The attestor 110 may generate the digital signature in one or multiple ways, depending on the particular implementation. As an example, in accordance with some implementations, for purposes of generating the digital signature, an attestor 110 may apply a hash function to the content of fields 156, 158, 160, 162, 164 and 165 of the audit record 154 to produce a hash. The attestor 110 may then encrypt the hash with a private part (also called a "private key") of an asymmetric cryptographic key (e.g., an Rivest-Sharmir-Adleman (RSA) key) to produce the digital signature. The audit record 154 may be authenticated by applying the hash function to the fields 156, 158, 160, 162, 164 and 165 of the audit record 154 to provide a first value; decrypting the signature based on the public part (also called the "public key") of the asymmetric cryptographic key to provide a second value; and comparing the first and second values to determine if they are the same. In this manner, if the two values are the same, then the signature is verified, i.e., a determination is made that tampering has not occurred.

In the context used herein, a "hash" (which may also be referred to as a "hash value," "cryptographic hash," or "cryptographic hash value") is produced by the application of a cryptographic hash function to a value (e.g., an input, such as an image). A "cryptographic hash function" may be a function that is provided through the execution of machine-executable instructions by a processor (e.g., one or multiple central processing units (CPUs), one or multiple CPU processing cores, and so forth). The cryptographic hash function may receive an input, and the cryptographic hash function may then generate a hexadecimal string to match the input. For example, the input may include a string of data (for example, the data structure in memory denoted by a starting memory address and an ending memory address). In such an example, based on the string of data the cryptographic hash function outputs a hexadecimal string. Further, any minute change to the input may alter the output hexadecimal string. In another example, the cryptographic hash function may be a secure hash function (SHA), any federal information processing standards (FIPS) approved hash function, any national institute of standards and technology (NIST) approved hash function, or any other cryptographic hash function. In some examples, instead of a hexadecimal format, another format may be used for the string.

A non-header portion 169 of the audit record 154, in accordance with example implementations, contains data representing system activity during the motor vehicle test. For example, for an audit record 154 that is associated with a reference software configuration policy, the non-header portion 169 may contain data representing log entries of software events (e.g., all software events) that occurred during the motor vehicle test, with each entry containing the software asset identifier(s) that were involved in the event. As another example, for an audit record 154 that is associated with a reference compute configuration policy, the non-header portion 169 may contain data representing log entries of compute events that occurred during the motor vehicle test, with each entry containing the compute asset identifier(s) that were involved in the event. Similarly, for an audit record 154 that is associated with a reference data configuration policy, the non-header portion 169 may contain data representing log entries of data events that occurred during the motor vehicle test, with each entry containing the data asset identifier(s) that were involved in the event.

In accordance with further example implementations, a given audit record 154 may be associated with multiple reference configuration policies. For example, in accordance with some implementation, an audit record 154 may contain a header portion 155 corresponding to compute, software and data configuration policies, and the non-header portion 169 may contain data that logs all compute, software and data events that occurred during the motor vehicle test.

FIG. 1C depicts the content of a reference configuration policy record 174 in accordance with an example implementation. It is noted that FIG. 1C depicts one out of many possible implementations of the configuration policy record 174. Regardless of its specific form, the configuration policy record 174 contains data to identify a particular reference configuration for a particular processing system of the distributed computing system 100. Moreover, in accordance with further example implementations, multiple configuration policy records may be used to describe a particular reference configuration. In accordance with yet further example implementation a single configuration policy record 174 may describe multiple reference configurations for the same processing system and/or for different processing systems.

Referring to FIG. 1C in conjunction with FIG. 1A, in accordance with some implementations, a configuration policy record 174 may contain a field 176 that contains data representing a policy ID for the configuration policy record 174. Moreover, as also depicted in FIG. 1C, in accordance with example implementations, the configuration policy record 174 may include a field 178 that contains data that represents a particular type (e.g., compute, software or data) of the configuration policy record 174. The configuration policy record 174 may further contain, in accordance with example implementations, one or multiple fields 180 that contain data representing a configuration policy description. In this manner, the configuration policy description 180 may, in general, set forth any of a variety of different information describing a given reference compute, software or data configuration for a particular processing system. This description may, for example, identify version numbers, measurement hashes, particular values, serial numbers, model numbers, dataset identifiers, version numbers or other information.

Figure 2:
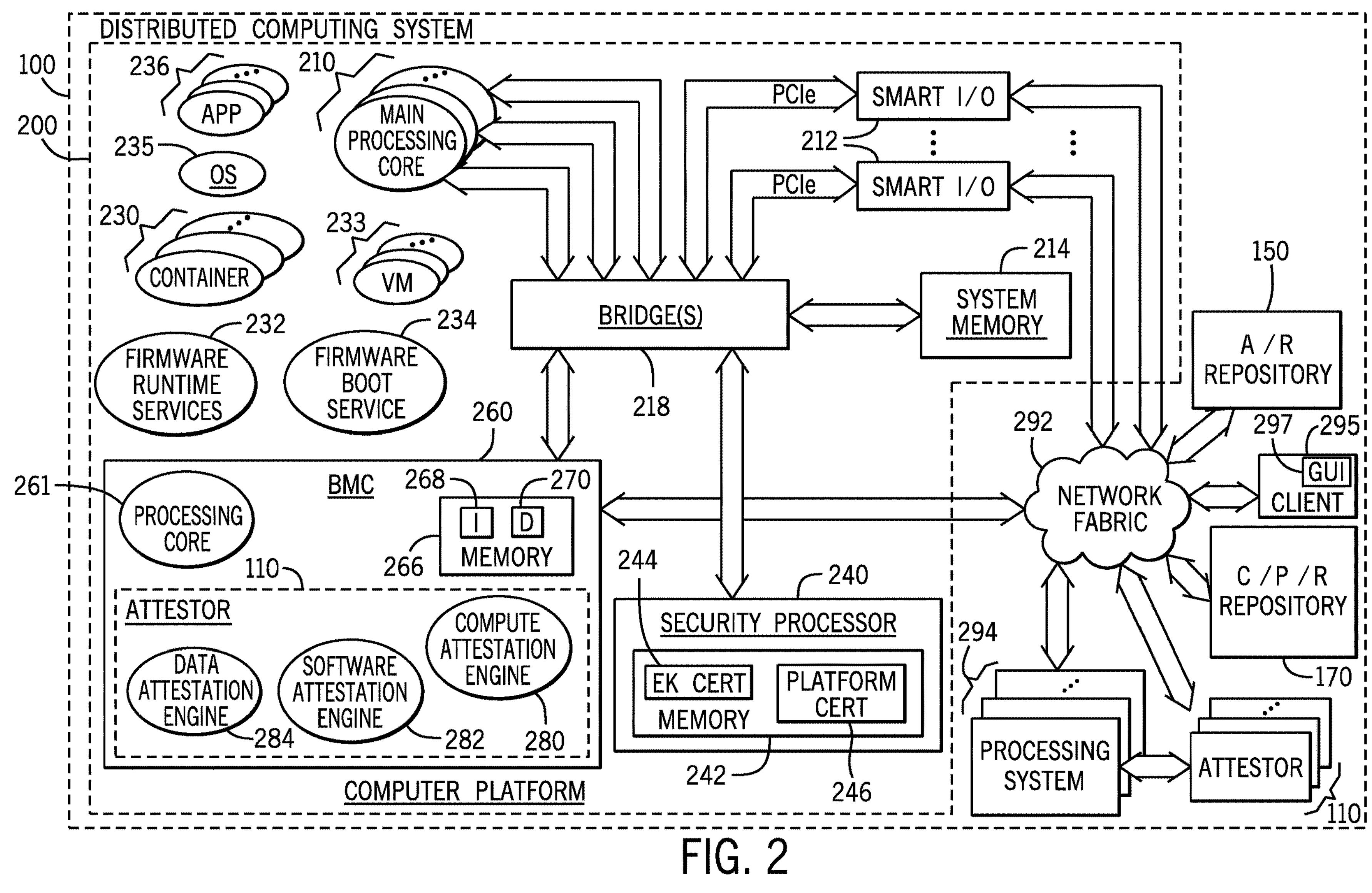
FIG. 2 is a block diagram of the distributed computing system of FIG. 1 depicting a computer platform of the distributed computing system in more detail according to an example implementation.

FIG. 2 depicts the distributed computing system 100, illustrating an example implementation of the computer platform 200. It is noted that in accordance with further implementations, the computer platform 200 may have a different and/or a modified architectures than what is depicted in FIG. 2.

In accordance with example implementations, the computer platform 200 contains the remote processing system 118 and the attestor 110-3 of FIG. 1. Although an example implementation of the attestor 110-3 is described in connection with FIG. 2, it is noted that the attestor 110 may have different and/or a modified architecture than what is depicted in FIG. 2. Moreover, in accordance with example implementations, the architectures for the attestors 110 of the distributed computing system may be different and may be tailored for the specific associated processing systems.

Referring to FIG. 2, for purposes of performing a motor vehicle test, the computer platform 200 may communicate with other processing systems 294 (e.g., motor vehicle processing systems, environmental sensors, in-vehicle sensors, in-vehicle processing systems, a local processing system or other system) of the distributed computing system 100 via network fabric 292. The network fabric 292 may be associated with one or multiple types of communication networks, such as (as examples) Fibre Channel networks, Compute Express Link (CXL) fabric, dedicated management networks, local area networks (LANs), wide area networks (WANs), global networks (e.g., the Internet), wireless networks, or any combination thereof. As also depicted in FIG. 2, in accordance with example implementations, the audit record repository 150 and the configuration policy depository 170 may be coupled to the network fabric 292.

In accordance with example implementations, a client 295 that is coupled to the network fabric 292 may initiate a motor vehicle test. In this manner, a test administrator may, via selections made using a graphical user interface (GUI) 297 of the client 295, specify, for the motor vehicle test, compute, asset and data configurations for the processing systems of the distributed computing system 100. In accordance with example implementations, specifying the compute, asset and data configurations for the processing systems includes the client 295 generating a message for each processing system, which specifies references to the configuration policy records to be used for the motor vehicle test.

In accordance with example implementations, the attestor 110 associated with each processing system verifies whether the processing system complies with the configuration policies specified for the processing system. If the processing system is in compliance, then the attestor 110 allows the processing system to participate in the motor vehicle test. Moreover, if in compliance, the attestor 110 generates one or multiple corresponding audit records attesting to the processing system complying with the configuration policies and recording system activities during the motor vehicle test. The attestor 110 may take action to cause the corresponding audit record(s) to be stored in the audit repository 150. In accordance with example implementations, if the attestor 110 determines that the associated processing system does not comply with the specified configuration policies, then the attestor 110 takes one or multiple responsive actions (e.g., sending a message to the client 295 to notify the test administrator, preventing the associated local processing system from participating in the motor vehicle test, preventing the motor vehicle test from being conducted, or another action).

In accordance with some implementations, the attestor 110 may allow the associated processing system to take part in the motor vehicle test even if the processing system did not fully comply with the reference policies. For example, the attestor 110 may store data in the audit record that represents which asset identities did and not comply. In accordance with some implementations, a given reference configuration policy record may specify certain asset identities for which compliance is to be verified before the processing system is allowed to participate in the motor vehicle test.

It is noted that the compliance check may not only be relevant during the motor vehicle test, the compliance check may be relevant at a later time (e.g., years later) for such purposes as ensuring that the motor vehicle test was not compromised and providing relevant information for auditing purposes.

For the example implementation that is depicted in FIG. 2, the computer platform 200 contains both a remote processing system and an associated attestor 110. In accordance with further implementations, an attester 110 may be separate from its associated processing system 294. Moreover, in accordance with some implementations, a given attestor 110 may be associated with multiple processing systems and attest to the software, hardware and data configurations of the local processing systems 294.

In accordance with example implementations, the computer platform 200 may be a modular unit, which includes a frame, or chassis. Moreover, this modular unit may include hardware that is mounted to the chassis and is capable of executing machine-executable instructions. A blade server is an example of the computer platform 200, in accordance with an example implementation. The computer platform 200 may, however, be any of number of different platforms other than a blade server, in accordance with further implementations, such as a rack-mounted server, a client, a desktop, a smartphone, a laptop computer, a tablet computer, a modular switch, storage array, a cluster node, and so forth.

In accordance with some implementations, an attestor 110 for the computer platform 200 may include a compute attestation engine 280, a software attestation engine 282 and a data attestation engine 284. For the example implementation that is depicted in FIG. 2, the attestor is formed from components of a management controller, such as a baseboard management controller (BMC) 260. As described further herein, in accordance with some implementations, a given attestation engine (e.g., the compute attestation engine 280, the software attestation engine 282 or the data attestation engine 284) may be formed by a processing core 261 of the BMC 260 executing machine executable instructions (e.g., instructions 268 stored in a memory 270 of the BMC) 260 for purposes of performing functions (e.g., determining asset identities, comparing asset identities to configuration policies and generating digitally signed audit records) of the attestation engine.

In accordance with some implementations, a given attestation engine may contain hardware circuitry that does not execute machine-readable instructions and performs some or all of the functions of the attestation engine. For example, in accordance with some implementations, a given attestation engine may be or include an application specific integrated circuit (ASIC). In accordance with further implementations, a given attestation engine may be or include a programmable logic device, such as a field programmable gate array (FPGA) or a complex programmable logic device (CPLD).

As used herein, a "BMC," or "baseboard management controller," is a specialized service processor that monitors the physical state of a server or other hardware using sensors and communicates with a management system through a management network. The baseboard management controller may also communicate with applications executing at the operating system level through an input/output controller (IOCTL) interface driver, a representational state transfer (REST) API, or some other system software proxy that facilitates communication between the baseboard management controller and applications. The baseboard management controller may have hardware level access to hardware devices that are located in a server chassis including system memory. The baseboard management controller may be able to directly modify the hardware devices. The baseboard management controller may operate independently of the operating system of the system in which the baseboard management controller is disposed. The baseboard management controller may be located on the motherboard or main circuit board of the server or other device to be monitored. The fact that a baseboard management controller is mounted on a motherboard of the managed server/hardware or otherwise connected or attached to the managed server/hardware does not prevent the baseboard management controller from being considered "separate" from the server/hardware. As used herein, a baseboard management controller has management capabilities for sub-systems of a computing device, and is separate from a processing resource that executes an operating system of a computing device. The baseboard management controller is separate from a processor, such as a central processing unit, which executes a high-level operating system or hypervisor on a system.

In accordance with some implementations, the processing core 261 may be part of a management plane of the BMC 260 and execute a management stack. For these example implementations, the compute attestation engine 280, software attestation engine 282 and data attestation engine 284 may be part of the management stack. Through its management plane, the BMC 260 may, in addition to the services related to the attestor, provide a wide variety of management services for the computer platform 200, such as operating system runtime services; resource detection and initialization; pre-operating system services; and remote management functions.

In accordance with further implementations, the processing core 261 may not be part of the BMC's management plane but instead may be a part of the BMC's security plane. For example, in accordance with some implementations, the processing core 261 may be a security processor, which executes machine-readable instructions to, in addition to the services provided by the attestor, provide security services, such as storing cryptographic keys, generating cryptographic keys, sealing cryptographic keys, unsealing cryptographic keys, storing certificates, generating certificates, generating nonces, and other security-related functions.

The compute attestation engine 280, the software attestation engine 282 and the data attestation engine 284, in accordance with further implementations, may not be part of a BMC. For example, in accordance with further implementations, the compute attestation engine 280, the software attestation engine 282 and the data attestation engine 284 may be formed from dedicated hardware (e.g., a PLD, an FGPA or an ASIC) of the computer platform 200, which is separate from the BMC 260.

As another example, in accordance with further example implementations, the compute attestation engine 280, the software attestation engine 282 and the data attestation engine 284 may be formed in whole or in part from one or multiple main processing cores 210 (e.g., central processing unit (CPU) cores and graphics processing unit (GPU) cores) of the computer platform 200 executing machine-readable instructions (e.g., software and/or firmware).

As another example, in accordance with further example implementations, the compute attestation engine 280, the software attestation engine 282 and the data attestation engine 284 may reside on a smart I/O peripheral 212 of the computer platform 200.

In accordance with yet further example implementations, the compute attestation engine 280, the software attestation engine 282 and the data attestation engine 284 may be part of a component that communicates with the computer platform 200 but is physically separate from the computer platform 200.

Regardless of their specific forms, architectures or locations, the compute attestation engine 280, the software attestation engine 282 and the data attestation engine 284, in general, determine integrity measurements for compute assets, software assets and data assets, respectively, of the computer platform 200. In this context, an "integrity measurement" refers to a measured value that identifies a particular asset. In the following description, an integrity measurement is also referred to as an "identifier" for a particular asset. As described further herein, in accordance with example implementations, a given attestation engine may directly determine a given integrity measurement (e.g., compute a hash of a binary image or read data representing a model number of a device from a register of the device) or indirectly determine a given integrity measurement (e.g., read data representing a hash of a binary image calculated by a component other than the attestation engine or read certificate data listing a component identifier).

The compute attestation engine 280 may, in accordance with example implementations, determine identities of selected compute assets (e.g., all of the compute assets or a predetermined subset of all of the compute assets) of the computer platform 200. As examples, the compute assets may include one or more of the following: the main processing cores 210; memory modules that form a system memory 214; the security processor 240; the BMC 260; input/output (I/O) peripherals, such as smart I/O peripherals 212; non-volatile memory modules; I/O devices; and other hardware components of the computer platform 200. In accordance with example implementations, the system memory 214 and other memories and storage media that are discussed herein are non-transitory storage media that may be formed from semiconductor storage devices, memristor-based storage devices, magnetic storage devices, phase change memory devices, a combination of devices of one or more of these storage technologies, and so forth. The system memory 214 may represent a collection of both volatile memory devices and non-volatile memory devices.

The determination of the compute asset identities may, in accordance with example implementations, involve the compute attestation engine 280 determining compute asset identifiers for a specific set of compute assets of the computer platform 200 (e.g., compute asset identifiers for compute assets listed on a configuration policy record). An "identifier" for a compute asset, in the context used herein, refers to a value (e.g., a number, an alphanumeric identifier, an identifier that includes non-alphanumeric characters, or other identifying value) that identifies (e.g., uniquely identifies) a compute asset of a composite electronic device, such as the computer platform 200. The "compute asset" may be a component or subsystem of the composite processing system (e.g., the computer platform 200) or may be the composite processing system as a whole. As such, for the computer platform 200, a given compute asset identifier may identify the computer platform 200 as a whole (e.g., node serial number or platform model number) or any subpart thereof. Moreover, in accordance with example implementations, a given compute asset identifier may be an attribute (e.g., a serial number or model number) of the asset, a combination of attributes of the compute asset, or an identifier derived from attribute(s) of the compute asset.

As a more specific example, in accordance with some implementations, the compute attestation engine 280 may determine one or multiple compute asset identifiers of the computer platform 200 from a digital platform certificate that is stored on the platform 200. In this manner, a manufacturer of the computer platform 200 may create the platform certificate for the computer platform 200 and store the platform certificate in a memory of the computer platform 200. The platform certificate, in general, attests to certain attributes of the computer platform 200 and may identify certain compute assets of the computer platform 200. The attributes may include attributes that address the computer platform 200 as a whole (e.g., a platform model number, a platform serial number, a platform serial number, motherboard identifier, a specification that corresponds to the platform, and so forth). The attributes may include attributes that identify specific configuration elements of the computer platform, such as specific hardware components. Moreover, in accordance with example implementations, the attributes may identify, or reference, a specific security processor 240 for the computer platform 200 such that the platform certificate is bound to the specific security processor 240. The compute attestation engine 280 may, at a startup of the computer platform 200 (e.g., at power up or reset of the computer platform), validate the platform certificate for purposes of ensuring that the computer platform 200 has not been altered, i.e., for purposes of ensuring that the actual attributes of the computer platform 200 are the same as the attributes listed on the platform certificate.

The binding information of a platform certificate, which binds the platform certificate to a specific security processor 240 (e.g., a trusted platform module (TPM)) may be, for example, in the form of a reference to a digital certificate called an "endorsement key certificate," or "EK certificate." The EK certificate may contain data that represents identifying attributes, such as attributes representing a manufacturer of the security processor 240, a model of the security processor 240, a version of the security processor 240, a serial number of the security processor 240, a unique identifier of the security processor, or other attributes.

In accordance with some implementations, the security processor 240 may provide trusted computing operations for the computer platform 200, for purposes of ensuring that the platform 200 consistently behaves in expected ways. The security processor 240, in accordance with example implementations, may be in the form of a semiconductor package (or "chip") that is mounted to a motherboard of the node computer platform 200. The security processor 240 may be designed according to industry standards to provide hardware-based, security functions while also resisting tampering and malicious software. A TPM is one example of the security processor 240. In accordance with further example implementations, the security processor 240 may be a vTPM.

In accordance with some implementations, the compute attestation engine's comparison of the determined compute asset identities to the compute asset identities of the reference compute configuration may include the compute attestation engine 280 determining whether one or multiple certificates (e.g., a platform certificate and an EK certificate) of the computer platform 200 are the same certificate(s) that are specified by the reference compute configuration.

In accordance with some implementations, the compute attestation engine 280 may rely on one or multiple certificates other than or in addition to a platform certificate or an EK certificate, for purposes of determining compute asset identifiers for the computer platform 200. For example, in accordance with some implementations, the compute attestation engine 280 may determine whether the computer platform 200 stores a particular initial device identity (IDevID) certificate or locally significant device identity (LDevID) certificate.

In accordance with further implementations, the compute attestation engine 280 may rely partially on certificates or in accordance with yet further implementations, may not rely any on certificates for purposes of determining the compute asset identities. For example, in accordance with some implementations, the compute attestation engine 280 may independently take a compute asset inventory of the computer platform 200 and determine the corresponding compute asset identifiers. In this manner, in accordance with example implementations, the compute attestation engine 280 may read data from various compute assets of the computer platform 200 for purposes of determining the corresponding identifiers. The read data, in general, represents attributes (e.g., serial number, model number or other component identifier) of the compute assets, which may be used as identifiers for the assets.

The compute attestation engine 280 may, in accordance with example implementations, determine one or multiple operating system identifiers and one or multiple firmware identifiers for the computer platform 200. An "identifier" for a firmware or operating system asset, in the context used herein, refers to a value (e.g., a number, an alphanumeric identifier, an identifier that includes non-alphanumeric characters, or other identifying value) that identifies (e.g., uniquely identifies) the asset. As an example, the identifier may be a version number or license number of an operating system 235 or a firmware (e.g., a Unified Extensible Firmware Interface (UEFI) or a Basic Input/Output System (BIOS) that provides firmware runtime services 232 and/or firmware boot services 234 for the computer platform 200). As other examples, an identifier may be a cryptographic hash of an operating system image or a system firmware image.

In accordance with some implementations, the compute attestation engine 280 may determine one or multiple operating and/or firmware identifiers from one or multiple certificates (e.g., a platform certificate) that are stored on the computer platform 200. In accordance with further implementations, the compute attestation engine 280 may independently determine hashes of the operating system and/or system firmware, and use the determined hashes as the identifiers. In accordance with further implementations, the compute attestation engine 280 may derive the identifiers from hashes that are determined during a measured or secure boot of the computer platform 200.

In accordance with some implementations, a compute asset identifier may be an integrity measurement digest. In this manner, the security processor 240 may, for example, contain platform configuration registers (PCRs) that store an integrity measurement digest based on integrity measurements that are acquired by the computer platform 200 during a measured boot. The compute attestation engine 280, may, for example, determine a compute asset identifier for the computer platform 200 by requesting a quote of the integrity measurement digest from the security processor 240. The compute attestation engine 280 may then compare the received integrity measurement digest with an integrity measurement digest of the reference compute profile.

An attestor 110 may, for an associated processing system 294 other than a computer platform, determine compute asset identifiers for the processing system in way that is tailored specifically for the processing system 294. For example, for a mobile device (e.g., a mobile device associated with a sensor or application used in the mobile vehicle test), an associated attestor 110 may, as examples, determine one or multiple of the following compute asset identifiers: an International Mobile Equipment Identity (IMEI) number, a serial number of a subscriber identity module (SIM), a system firmware version, a hash of the system firmware image, operating system version, a hash of the operating system, a serial number of a hardware processor or a model of the hardware processor. As another example, for a sensor, an associated attestor 110 may determine one or multiple of the following compute asset identifiers: a serial number of the sensor, a model number of the sensor, a firmware version or a hash of a system firmware image of the sensor.

The software attestation engine 282 may, in accordance with example implementations, determine identities of selected software assets of the computer platform 200. The determination of the identities may, in accordance with example implementations, involve the software attestation engine 282 determining software asset identifiers for a predetermined set of software assets of the computer platform 200. An "identifier" for a software asset, in the context used herein, refers to a value (e.g., a number, an alphanumeric identifier, an identifier that includes non-alphanumeric characters, or other identifying value) that identifies (e.g., uniquely identifies) the asset. A "software asset," in this context, refers to a unit of machine-readable instructions other than machine-readable instructions that are affiliated with the compute infrastructure of the computer platform 200.

In accordance with example implementations, the identifier for a software asset may be a version number of the software asset or a hash of an image of the software asset. As examples, a software asset may be a driver (or driver instance), a library (or library instance, a container 230 (or container instance), an application 236 (or application instance), a pod of containers (or container instances), a virtual machine 233 (or virtual machine instance), or registry information (e.g., keys or values from the registry). In accordance with some implementations, the software attestation engine 282 may determine one or multiple software asset identifiers from certificate(s) stored on the computer platform 200, integrity measurements made by entities of the computer platforms other than the software attestation engine 282 and/or from a measurement integrity digest stored on the computer platform 200. In accordance with some implementations, the software attestation engine 282 may determine one or multiple software asset identifiers independently. For example, in accordance with some implementations, the software attestation engine 282 may determine a hash of a binary image of the software asset or determine a hash of source code that corresponds to the software asset.

An attestor 110 may, for a processing system 294 other than a computer platform, determine software asset identifiers for the processing system 294 in manner that is tailored to the processing system 294. For example, for a mobile device, an associated attestor may, as examples, determine a version of an application installed on the mobile device or a hash of a binary image of the application.

The data attestation engine 284 may, in accordance with example implementations, determine identities of selected data assets of the computer platform 200. The determination of the identities may, in accordance with example implementations, involve the data attestation engine 284 determining data asset identifiers for a predetermined set of data assets of the computer platform 200. An "identifier" for a data asset, in the context used herein, refers to a value (e.g., a number, an alphanumeric identifier, an identifier that includes non-alphanumeric characters, or other identifying value) that identifies (e.g., uniquely identifies) the asset. A "data asset," in this context, refers to data that configures the computer platform 200, is processed by the computer platform 200, or is produced by processing of the computer platform 200.

As an example, a data asset may be an input data set (e.g., a data set that defines environmental parameters or other test input) that is processed by the computer platform 200 as part of the motor vehicle test. As an example, a data asset may be an intermediate or final output data set that is processed by the computer platform 200 as part of the motor vehicle test. As another example, a data asset may be data that specifies environmental conditions for the motor vehicle test. As another example, a data asset may be data that specifies a variant or configuration option of the motor vehicle. As another example, a data asset may be data that specifies initial conditions for the motor vehicle test. As another example, a data asset may be data (e.g., BIOS configuration data or other configuration data) that configures the computer platform 200. As another example, a data asset may be data that configures a particular network port of the computer platform 200 to be used during the motor vehicle test.

In accordance with example implementations, an attestor may, for a processing system other than a computer platform, determine data asset identifiers for the processing system in a manner that is tailored to the processing system. For example, for a mobile device, an associated attestor may, as examples, determine identifiers for input data used in the mobile test and determine identifiers for mobile and wireless network configuration parameters.

In accordance with example implementations, the compute attestation engine 280, the software attestation engine 282 and the data attestation engine 284 may determine the asset identities responsive to the initiation of a test of a motor vehicle. For example, in accordance with some implementations, a test administrator (e.g., via the client 295) may submit a request to the distributed computing system to begin a test, and the compute attestation engine 280, the software attestation engine 282 and the data attestation engine 284 may, responsive to the request, determine the compute asset identifiers, the software asset identifiers and data asset identifiers, respectively. In accordance with some implementations a given attestation engine may determine one or multiple asset identifiers prior to the initiation of the test. For example, in accordance with some implementations, the compute attestation engine 280 may determine an initial set of compute asset identifiers in response to a boot of the computer platform 200 after a power on or reset of the platform 200, and the compute attestation engine 280 may update the compute asset identities responsive to any changes. For example, these changes may include hot swappable hardware components (e.g., memories or storage devices) being added or removed, or firmware or operating system updates being made.

Among its other features, in accordance with example implementations, the computer platform 200 may include a bus infrastructure that includes one or multiple bridges 218 that may be connected to the system memory 214, the smart I/O peripherals 212, the BMC 260 and the security processor 240 for purposes of establishing communications among these components. In accordance with some implementations, the main processing core 210 may include one or multiple semiconductor packages (or "chips"), and the main processing core 210 may include a north bridge 218 that includes a memory controller (for system memory 214 accesses) and PCIe root ports. The computer platform 200 may also include a south bridge 218 that provides I/O ports, such as Serial Advanced Technology Attachment (SATA) ports, Universal Serial Bus (USB) ports, Low Pin Count (LPC) ports, SPI ports, eSPI ports and so forth. In accordance with some implementations, the north bridge 218 may be part of the main processing core 210. In accordance with further implementations, the north and south bridges may be combined into a single bridge 218; and in accordance with some implementations, this single bridge 218 may be part of the main processing core 210.

Figure 3:
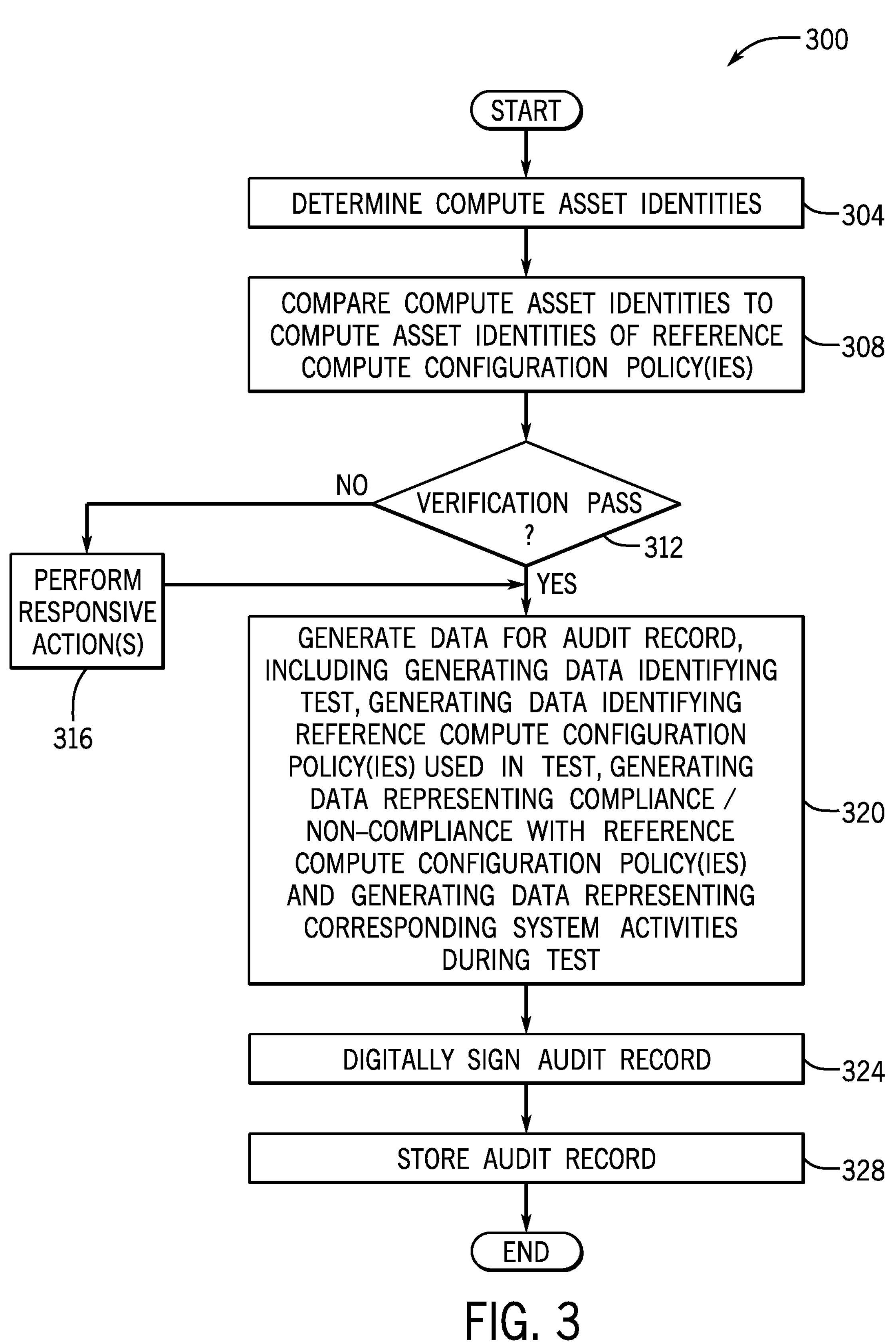
FIG. 3 is a flow diagram depicting a process performed by a compute attestation engine of the computer platform of FIG. 2 to verify compliance of the computer platform with a reference compute configuration policy for a motor vehicle test and create a signed audit record that contains a result of the compliance verification and documents system activity during the motor vehicle test according to an example implementation.

FIG. 3 depicts a process 300 that is performed by a compute attestation engine (e.g., the compute attestation engine 280 of FIG. 2) in accordance with example implementations in connection with a particular test of a motor vehicle. In accordance with example implementations, the compute attestation engine 280 may perform the process 300 responsive to the initiation of a particular motor vehicle test. In accordance with some implementations, the compute attestation engine 280 may perform parts of the process responsive to a boot of the computer platform.

More specifically, referring to FIG. 3, in accordance with some implementations, pursuant to the process 300, the compute attestation engine may determine (block 304) compute asset identities. For example, block 304 may be performed by the compute attestation engine responsive to a boot of the computer platform and may include determine updating asset identities responsive to specific actions occurring after the boot (e.g., hot swapping of hardware components, updating of the operating system, updating of firmware, as well as other actions). Pursuant to block 308 of the process 300, the compute attestation engine compares the compute asset identities to compute asset identities of one or multiple reference compute configuration policies. If, pursuant to decision block 312, the asset identities are the same, i.e., the compute attestation engine verifies compliance with the reference compute configuration policies, then the process 300 proceeds with generating data for the audit record, pursuant to block 320. As depicted in FIG. 3, generating data for the audit record may include the compute attestation engine generating data that identifies the motor vehicle test and the reference compute configuration policy(ies). Moreover, generating data for the audit record may include generating identifying the compliance/non-compliance with the reference compute configuration policy(ies) and generating data representing the corresponding system activities during the motor vehicle test. The compute attestation engine, pursuant to block 324, digitally signs the audit record and stores the audit record, pursuant to block 328.

If the compute attestation engine determines, pursuant to decision block 312, that the computer platform does not comply with the reference compute configuration policy (ies), then, in accordance with example implementations, the compute attestation engine may perform one or multiple responsive actions, pursuant to block 316. As an example, a particular responsive action may be setting a flag or communicating an alert to halt or prevent a particular motor vehicle test. As another example, a particular responsive action may be generating a message to a system administrator indicating that the computer platform does not comply with the reference compute configuration policy(ies). In accordance with some implementations, the compute attestation engine may wait from a response from the system administrator before allowing the motor vehicle test to proceed. In accordance with some implementations, the compute attestation engine may (e.g., dependent upon a noncompliance policy set forth in the reference compute configuration policy(ies)) allow the computer platform to proceed with the motor vehicle test (with the non-complying compute assets being documented in the audit record), and control may then proceed to block 320.

Figure 4:
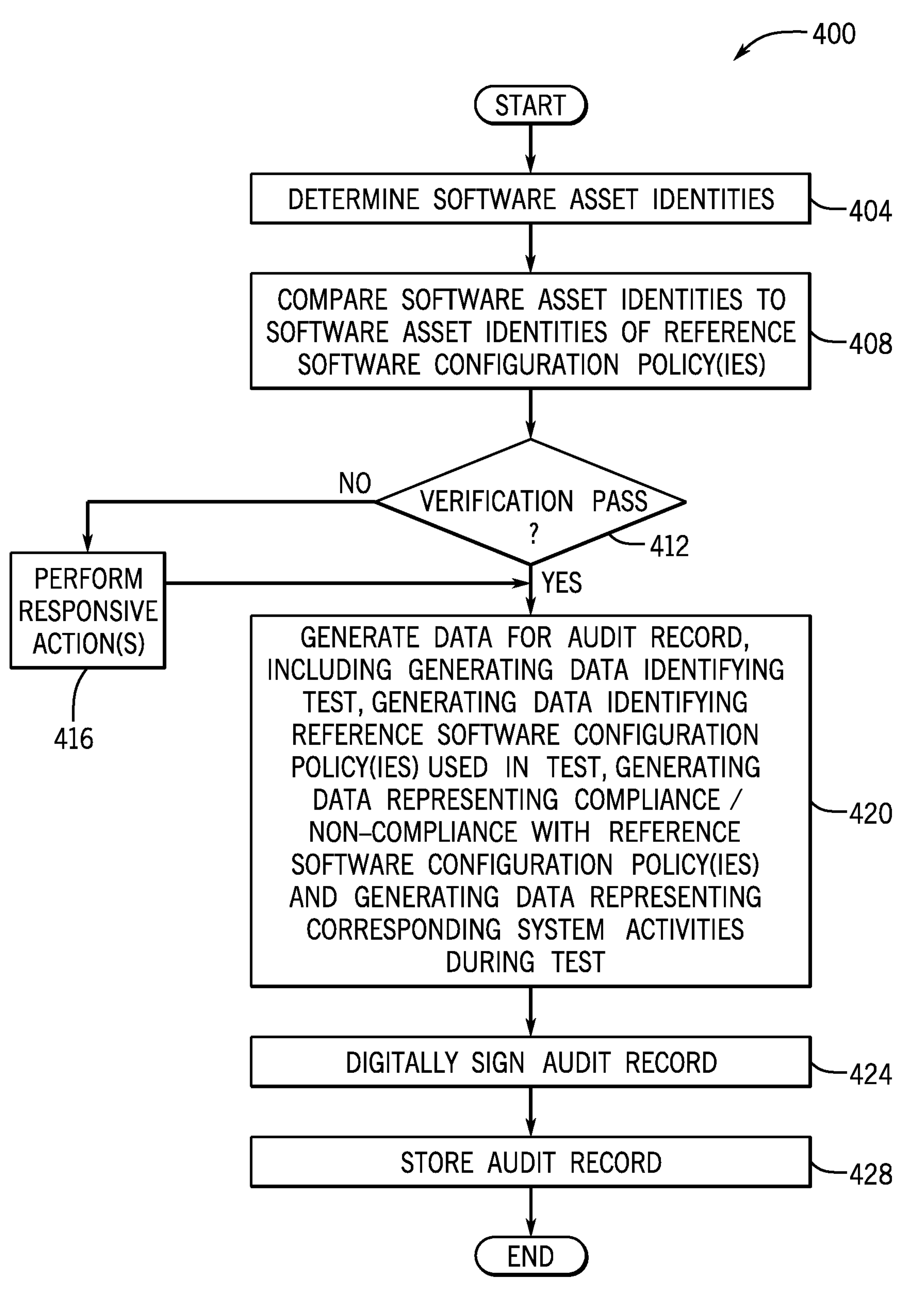
FIG. 4 is a flow diagram depicting a process performed by a software attestation engine of the computer platform of FIG. 2 to verify compliance of the computer platform with a reference software configuration policy and create a signed audit record that contains a result of the compliance verification and documents system activity during the motor vehicle test according to an example implementation.

FIG. 4 depicts a process 400 that is performed by a software attestation engine (e.g., the software attestation engine 282 of FIG. 2) in accordance with example implementations. Referring to FIG. 4, pursuant to block 404 of the process 400, the software attestation engine determines software asset identities of the computer platform. In accordance with some implementations, block 404 may be performed in response to a boot of the computer platform 200. In this manner, the software attestation engine may determine the software asset identities responsive to the boot and thereafter update the software asset identities responsive to software asset changes (e.g., a software update, the installation of a particular application, the starting of a virtual machine, or other change). In accordance with some implementations, the software attestation engine may perform block 404 in its entirety responsive to the initiation of a motor vehicle test.

As depicted in FIG. 4, in accordance with example implementations, pursuant to block 408, the software attestation engine may compare the determined software asset identities to the software asset identities of one or multiple reference software configuration policies. This comparison may be made, for example, in response to a user request to initiate the test. Pursuant to decision block 412, the software attestation engine determines whether the software assets of the computer platform comply with the reference software configuration policy(ies).

If the comparison reveals compliance, then the process proceeds to block 420. If the comparison reveals noncompliance, then, pursuant to block 416, the software attestation engine may perform one or multiple responsive actions, similar to the responsive actions discussed above for compute attestation engine for the process of FIG. 3. Moreover, in accordance with some implementations, the software attestation engine may (e.g., dependent upon a noncompliance policy set forth in the reference software configuration policy(ies)) allow the computer platform to proceed with the motor vehicle test (with the non-complying assets being documented in the audit record), and control may then proceed to block 420.

Pursuant to block 420, the software attestation engine generates data for the corresponding audit record. This data includes data that identifies the reference software configuration policy(ies), data that represents the compliance/noncompliance with the software configuration policy(ies) and data that represents the corresponding system activities during the test. As depicted in blocks 424 and 428, the software attestation engine may then digitally sign and store the audit record.

Figure 5:
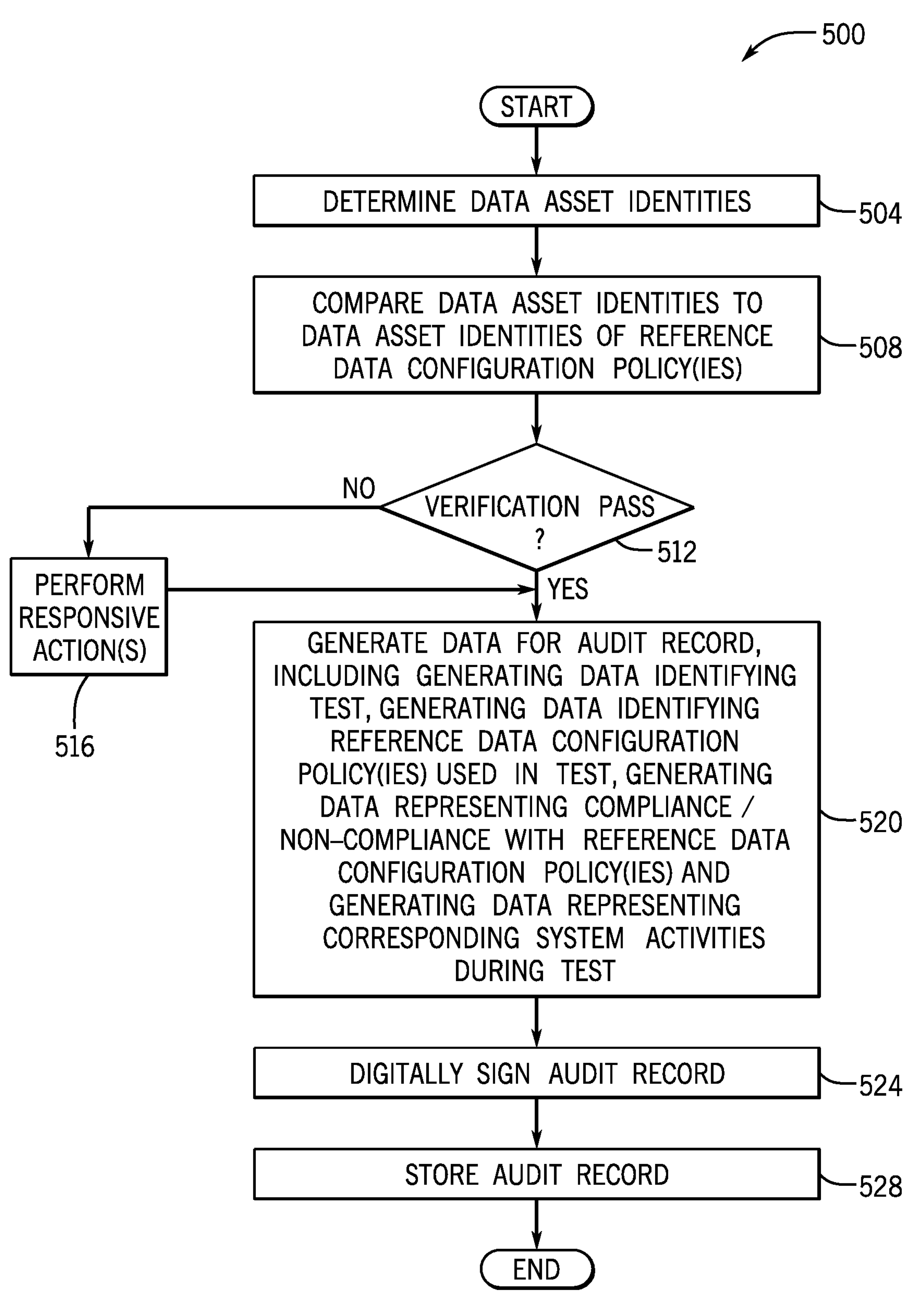
FIG. 5 is a flow diagram depicting a process performed by a data attestation engine of the computer platform of FIG. 2 to verify compliance of the computer platform with a reference data configuration policy for a motor vehicle test and create a signed audit record that contains a result of the compliance verification and documents system activity during the motor vehicle test according to an example implementation.

FIG. 5 depicts a process 500 that may be performed by a data attestation engine (e.g., the data attestation engine 284 of FIG. 2) in accordance with example implementations. Referring to FIG. 5, pursuant to block 504, the data attestation engine 284 determines data asset identities of the computer platform. In accordance with some implementations, this determination may be made responsive to the initiation of a test of a motor vehicle. Pursuant to block 508, the data attestation engine 284 compares the data asset identifies to data asset identities of one or multiple reference data configuration policies. If the data asset identities comply with the reference data configuration policy(ies), then the data attestation engine proceeds to generate the data for the audit record, pursuant to block 512. If the data attestation engine 284 determines, pursuant to decision block 512, that the computer platform does not comply with the data configuration policy(ies), then the data attestation engine may perform one or multiple responsive actions, pursuant to block 516. These actions may be similar to the ones discussed above for noncompliance detected by the compute attestation engine or software attestation engine in connection with FIGS. 3 and 4. Moreover, in accordance with some implementations, the data attestation engine may (e.g., dependent upon a noncompliance policy set forth in the reference data configuration policy(ies)) allow the computer platform to proceed with the motor vehicle test (with the non-complying data assets being documented in the audit record), and control may then proceed to block 520.

Pursuant to block 520, the data attestation engine generates data for the corresponding audit record. This data includes data that identifies the reference data configuration policy(ies), data that represents the compliance/non-compliance with the data configuration policy(ies) and data that represents the corresponding system activities during the test. Pursuant to blocks 524 and 528, the data attestation engine may then digitally sign and store the audit record.

Referring to FIG. 6, in accordance with example implementations, a process 600 includes testing (block 604) a motor vehicle using a distributed computing system. The distributed computing system includes a plurality of hardware components and a plurality of software components. The plurality of hardware components includes first hardware components of the vehicle and second hardware components that are separate from the vehicle. As an example, the first hardware components may include in-vehicle sensors, such as speed sensors, accelerometers, sonar sensors and radar sensors. As an example, the second hardware components may include a local processing system (e.g., a laptop computer or smartphone), environmental sensors or a remote processing system (e.g., a cloud-based processing system). The plurality of software components includes first software components of the vehicle and second software components separate from the vehicle. In accordance with example implementations the first software components may include the system firmware of the motor vehicle, and the second software components may include a container image or virtual machine image of a computer platform.

The process 600 includes, responsive to the testing, generating, by the distributed computing system, an audit record. As an example, the audit record may identify a particular configuration policy and may identify a particular motor vehicle test. Generating the audit record includes determining, by the distributed computing system, integrity measurements of the first hardware components, the second hardware components, the first software components and the second software components. The integrity measurements may be hashes, version numbers, measurement digests or other integrity measurements. Generating the audit record further includes comparing, by the distributed computing system, the integrity measurements to reference measurements that correspond to reference hardware configuration for the distributed computing system and a reference software configuration for the distributed computing system. The reference measurements may be measurements that are stored in a configuration policy repository. Generating the audit record includes providing, by the distributed computing system, responsive to the comparison, digitally signed data for the audit record attesting to the distributed computing system having the reference hardware configuration and the reference software configuration in connection with the testing. Providing the digitally signed data may include applying a cryptographic hash function to the data to provide a hash and encrypting the hash with a private part of an asymmetric cryptographic key to provide a digital signature.

Figure 7:
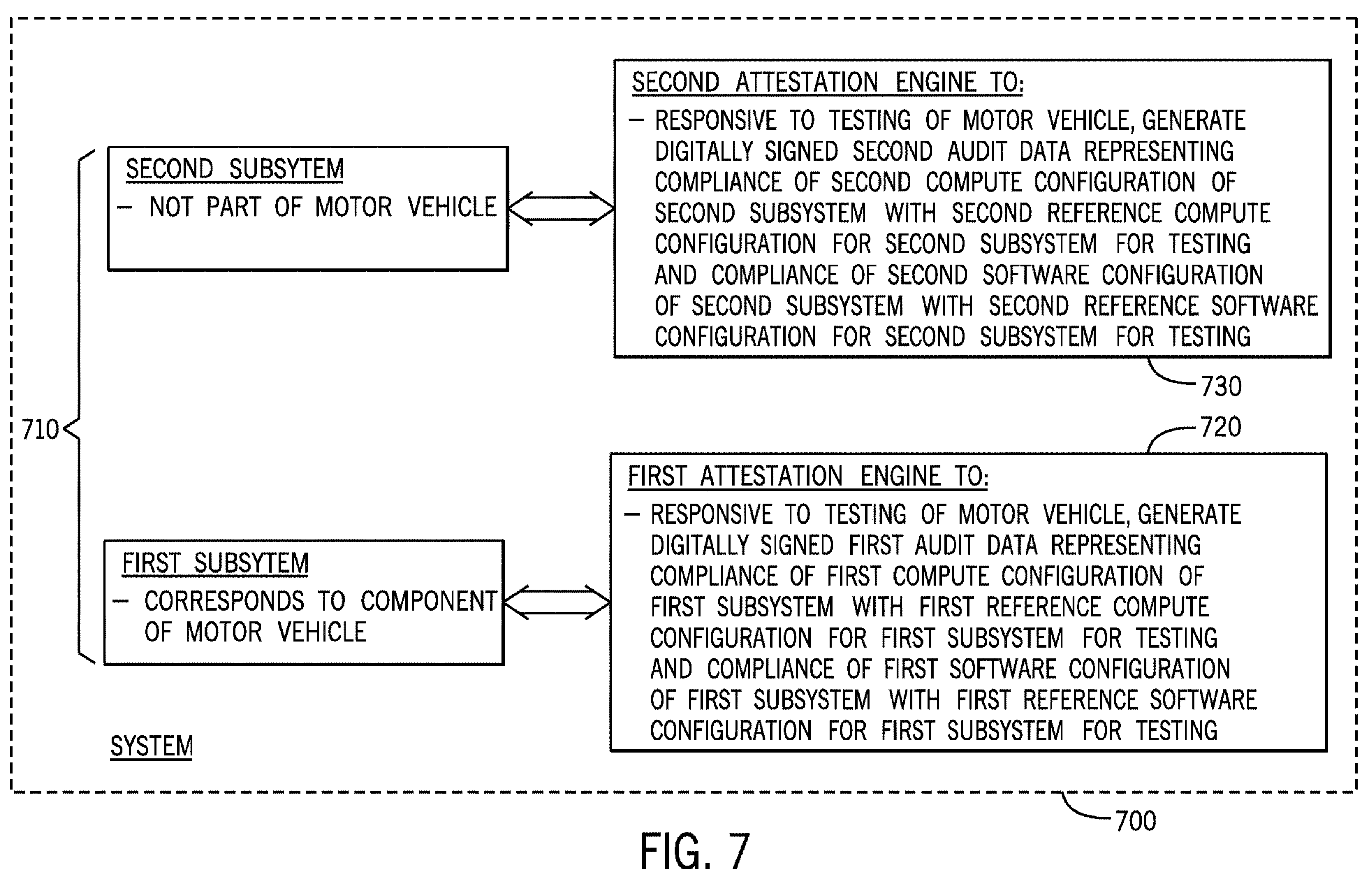
FIG. 7 is a block diagram of a system to create audit data representing compliance of compute and software configurations for a test of a motor vehicle according to an example implementation.

Referring to FIG. 7, in accordance with example implementations, a system 700 includes a plurality of subsystems 710 to collectively perform testing of a motor vehicle. A first subsystem 710 corresponds to a component of the motor vehicle and a second subsystem 710 is not part of the motor vehicle. As an example, the first subsystem 701 may be a safety, braking or driving subsystem of the motor vehicle. As an example, the second subsystem may be a local computer, a smart phone of a remote cloud-based computing platform.

A first attestation engine 720 is associated with the first subsystem 710 to, responsive to the testing of the motor vehicle, generate digitally signed first audit data that represents compliance of a first hardware configuration of the first subsystem 710 with a first reference hardware configuration for the first subsystem 710 for the testing and compliance of a first software configuration of the first subsystem 710 with the first reference software configuration for the first subsystem for the testing. The first attestation engine may be part of the first subsystem or may be separate from the first subsystem. The first attestation engine may be formed from dedicated logic (e.g., a PLD or FPGA) that does not execute machine-readable instructions, a hardware processor that executes machine-readable instructions, or a combination of a hardware processor and dedicated logic. The first attestation engine may attest to audit data for one or multiple subsystems other than the first subsystem.

A second attestation engine 730 associated with the second subsystem 710, responsive to the testing of the motor vehicle, generates digitally signed second audit data. The second audit data represents compliance of a second hardware configuration of the second subsystem 710 with a second reference hardware configuration for the second subsystem for the testing and compliance of a second software configuration of the second subsystem 710 with a second reference software configuration for the second subsystem for the testing. The second attestation engine may be part of the second subsystem or may be separate from the second subsystem. The second attestation engine may be formed from dedicated logic, a hardware processor or a combination of a dedicated logic and a hardware processor. The second attestation engine may attest to audit data for one or multiple subsystems other than the second subsystem. Generating digitally signed data may include applying a cryptographic hash function to the data to provide a hash and encrypting the hash with a private part of an asymmetric cryptographic key to provide a digital signature.

Figure 8:
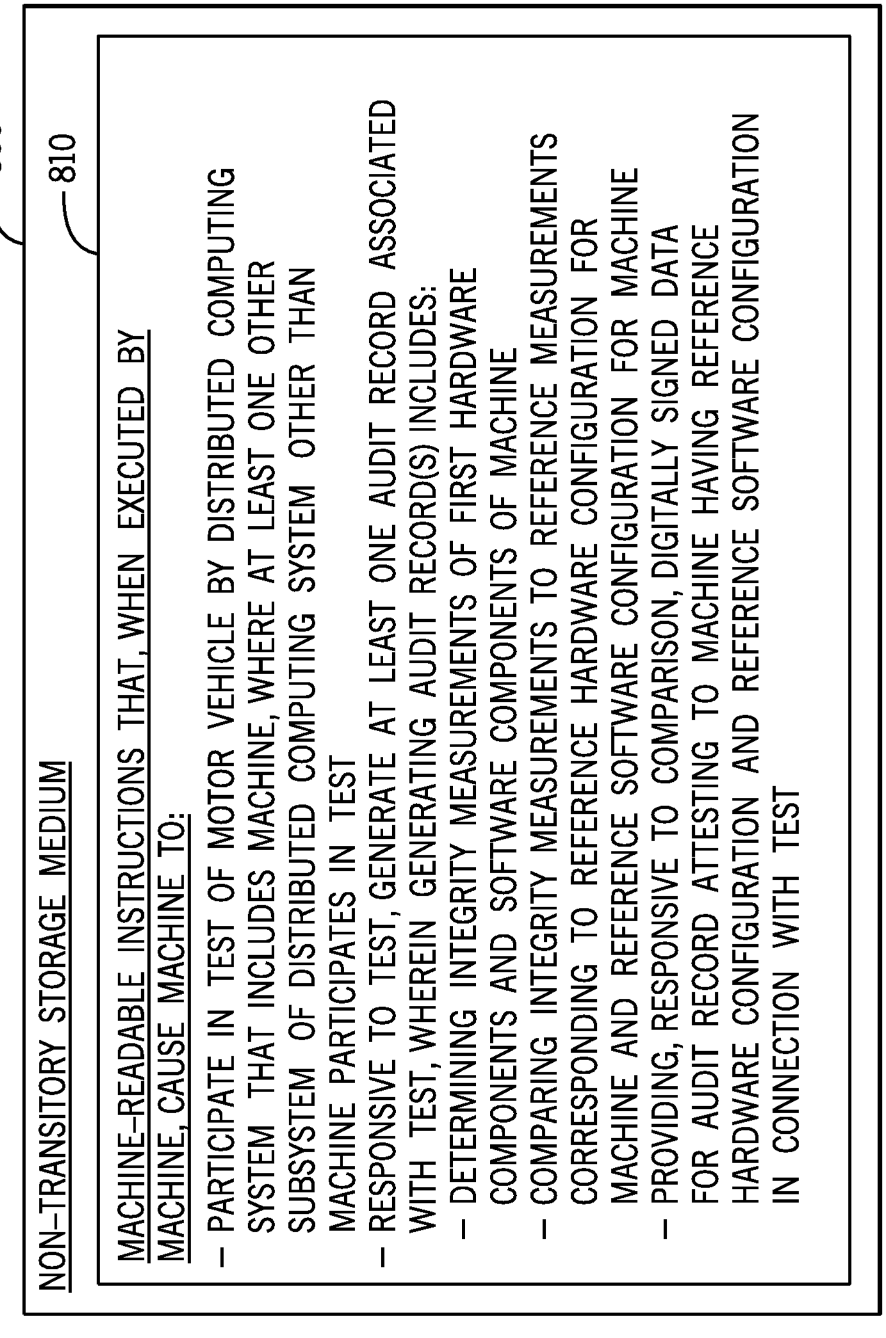
FIG. 8 is an illustration of machine-readable instructions stored on a non-transitory storage medium that, when executed by a machine, cause the machine to generate at least one audit record that is associated with a test of a motor vehicle and attests to compliance with reference compute and software configurations according to an example implementation.

Referring to FIG. 8, in accordance with example implementations, a non-transitory storage medium 800 stores machine-readable instructions 810 that, when executed by a machine of a distributed computing system, cause the machine to participate in a test of a motor vehicle by the distributed computing system. In some implementations, the distributed computing system may include one or multiple local processing systems, such as an in-vehicle processing system (e.g., a braking, driving or safety subsystem of the motor vehicle and an out-of-vehicle systems (e.g., a laptop computer, tablet computer, a smart phone or an environmental sensor). As examples, the machine may be a processing system of the motor vehicle, a local processing system that is not part of the motor vehicle, or a remote processing system. At least one other subsystem of the distributed computing system other than the machine participates in the test.

The instructions 810, when executed by the machine, further cause the machine to, responsive to the test, generate an audit record that is associated with the test. In accordance with example implementations, the audit record may contain data that identifies the test, and the audit record may contain that identifies a policy configuration record. Generating the audit record includes determining integrity measurements of first hardware components and software components of the machine; and comparing the integrity measurements to reference measurements that correspond to a reference hardware configuration for the machine and a reference software configuration for the machine. In accordance with example implementations, the reference measurements may be specified by a configuration policy record that is identified by the audit record. Generating the audit record further includes providing, responsive to the comparison, digitally signed data for the audit record attesting to the machine having the reference hardware configuration and the reference software configuration in connection with the test. Providing the digitally signed data may include applying a cryptographic hash function to the data to provide a hash and encrypting the hash with a private part of an asymmetric cryptographic key to provide a digital signature.

In accordance with example implementations, the process includes allowing the testing responsive to the comparison. Particular advantages include a detailed, accurate and trustworthy way to document a motor vehicle test, which is tested using a distributed computing system.

In accordance with example implementations, the process further includes determining additional integrity measurements of data associated with the testing. The comparison includes comparing the additional integrity measurements to a reference data configuration for the distributed computing system. Providing the digitally signed data includes providing the digitally signed data for the audit record attesting to the distributed computing system having the reference data configuration. Particular advantages include a detailed, accurate and trustworthy way to document a motor vehicle test, which is tested using a distributed computing system.

In accordance with example implementations, providing the digitally signed data includes generating data representing a reference to a description of the reference hardware configuration and a reference to the reference software configuration. Particular advantages include a detailed, accurate and trustworthy way to document a motor vehicle test, which is tested using a distributed computing system.

In accordance with example implementations, the test includes performing of at least one of an integration process, a verification process or a validation process. Particular advantages include a detailed, accurate and trustworthy way to document a motor vehicle test, which is tested using a distributed computing system.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:

responsive to a test for a motor vehicle using a distributed computing system, verifying, by the distributed computing system, whether the test complies with a reference hardware configuration for the distributed computing system and the test complies with a reference software configuration for the distributed computing system, wherein the distributed computing system comprises an in-vehicle processing system of the motor vehicle and a second processing system external to the motor vehicle, wherein the distributed computing system comprises a plurality of hardware components and a plurality of software components, wherein the plurality of hardware components comprises first hardware components of the in-vehicle processing system and second hardware components of the second processing system, wherein the plurality of software components comprises first software components of the in-vehicle processing system and second software components of the second processing system, and wherein the verifying comprises:

determining, by the distributed computing system, integrity measurements of the first hardware components, the second hardware components, the first software components and the second software components, wherein the determining the integrity measurements comprises applying a cryptographic hash function to a value associated with at least one of the first hardware components, the second hardware components, the first software components and the second software components to derive a hash corresponding to a given integrity measurement of the integrity measurements; and comparing, by the distributed computing system, the integrity measurements to reference measurements corresponding to the reference hardware configuration and the reference software configuration; and managing the test responsive to a result of the verifying, wherein the managing comprises responsive to determining that the test complies with the reference hardware configuration and the reference software configuration, providing, by the distributed computing system, digitally signed data for audit records for the first hardware components, the second hardware components, the first software components and the second software components, and wherein the audit records attest to the distributed computing system having the reference hardware configuration and the reference software configuration in connection with the test, wherein providing the digitally signed data comprises encrypting a content corresponding to the integrity measurements with a cryptographic key to provide a digital signature corresponding to a given audit record of the audit records.

2. The method of claim 1, wherein the managing the test further comprises:

allowing the test responsive to the determining that the test complies with the reference hardware configuration and the reference software.

3. The method of claim 1, further comprising:

determining additional integrity measurements of data associated with the test, wherein:

the comparing further comprises comparing the additional integrity measurements to a reference data configuration for the distributed computing system; and the providing the digitally signed data further comprise providing digitally signed data for the given audit record attesting to the distributed computing system having the reference data configuration.

4. The method of claim 1, wherein the providing the digitally signed data comprises generating data representing a reference to a description of the reference hardware configuration and a reference to the reference software configuration.

5. The method of claim 1, wherein the test comprises performing at least one of an integration process, a verification process or a validation process.

6. A system comprising:

a plurality of subsystems to collectively perform testing of a motor vehicle, wherein an in-vehicle subsystem of the plurality of subsystems corresponds to a component of the motor vehicle, wherein a second subsystem of the plurality of subsystems is external to the motor vehicle, wherein the in-vehicle subsystem comprises first hardware components and first software components, and wherein the second subsystem comprises second hardware components and second software components; and a plurality of attestation engines comprising:

a first attestation engine associated with the in-vehicle subsystem to, responsive to the testing of the motor vehicle, verify whether the testing complies with a first reference hardware configuration for the in-vehicle subsystem and whether the testing complies with a first reference software configuration for the in-vehicle subsystem, wherein the verifying by the first attestation engine comprises determining integrity measurements of the first hardware components and the first software components, wherein the verifying comprises comparing the integrity measurements to the first reference hardware configuration and the first reference software configuration, wherein the first attestation engine to manage the testing, and wherein the managing of the testing by the first attestation engine comprises responsive to a determination by the first attestation engine that the testing complies with the first reference hardware configuration and the testing complies with the first reference software configuration, generating first audit data representing compliance of the testing with the first reference hardware configuration and the first reference software configuration, and applying a cryptographic hash function to the first audit data to generate a hash corresponding to a first signature for the first audit data; and a second attestation engine associated with the second subsystem to, responsive to the testing of the motor vehicle, verify whether the testing complies with a second reference hardware configuration for the second subsystem and the testing complies with a second reference software configuration for the second subsystem, wherein the verifying comprises determining second integrity measurements of the second hardware components and the second software components, wherein verifying comprises comparing second integrity measurements to the second reference hardware configuration and the second reference software configuration, wherein the second attestation engine to manage the testing, and wherein the managing of the testing by the second attestation engine comprises responsive to a determination by the second attestation engine that the testing complies with the second reference hardware configuration and the testing complies with the second reference software configuration, generating second audit data representing compliance of the testing with the second reference hardware configuration and the second reference software configuration, and applying a cryptographic hash function to the second audit data to generate a hash corresponding to a second signature for the second audit data.

7. The system of claim 6, wherein:

the in-vehicle subsystem comprises a first component of the motor vehicle;

the first audit data represents an attestation to compliance of the first component with the first reference hardware configuration and the first reference software configuration;

the second subsystem comprises a computer system to simulate integration of the first component with a second component of the motor vehicle;

the second audit data represents an attestation to compliance of the computer system to the second reference hardware configuration and the second reference hardware configuration.

8. The system of claim 7, wherein the computer system comprises one of a computer platform having the same geographical location as the first component and a cloud computing system being located at a different geographical location than the first component.

9. The system of claim 7, wherein the first component comprises an electronic control unit (ECU).

10. The system of claim 6, wherein:

the testing comprises performing one of a driving test or a crash test of the motor vehicle;

the in-vehicle subsystem comprises a first component of the motor vehicle;

the first audit data represents an attestation to compliance of the first component with the first reference hardware configuration and the first reference software configuration;

the second subsystem comprises a computer system to acquire measurements from the motor vehicle responsive to the one of the driving test or the crash test;

the second audit data represents an attestation to compliance of the computer system to the second reference hardware configuration and the second reference hardware configuration.

11. The system of claim 6, wherein:

the testing comprises performing a test of the motor vehicle;

the in-vehicle subsystem comprises a first component of the motor vehicle;

the first audit data represents an attestation to compliance of the first component with the first reference hardware configuration and the first reference software configuration;

the second subsystem comprises a computer system to acquire measurements from the vehicle responsive to the test;

the second audit data represents an attestation to compliance of the computer system to the second reference hardware configuration and the second reference hardware configuration.

12. The system of claim 6, wherein:

the first audit data further represents compliance of a first data policy of the in-vehicle subsystem with a first reference data policy for the in-vehicle subsystem; and the second audit data further represents compliance of a second data policy of the second subsystem with a second reference data policy for the second subsystem.

13. The system of claim 12, wherein the first reference data policy comprises at least one of:

a predefined input data set, a predefined output data set, a predefined set of configuration data; or a predefined set of encrypted data.

14. The system of claim 6, wherein the first reference hardware configuration comprises at least one of a hardware device identification, a firmware identification or an operating system identification.

15. The system of claim 6, wherein the first reference software configuration comprises at least one of a software image measurement, software version number, a registry key, a register value or a port associated with a software service.

16. The system of claim 6, wherein:

the first audit data further contains data representing a reference to at least one record of a data repository containing a description of the first reference hardware configuration and the first reference software configuration; and the second audit data further contains data representing a reference to at least one record of the data repository containing a description of the second reference hardware configuration and the second reference software configuration.

17. The system of claim 6, wherein the managing of the test by the first attestation engine further comprises responsive to the determination by the first attestation engine that the testing complies with the first reference hardware configuration and the testing complies with the first reference software configuration, allow the test.

18. A non-transitory storage medium to store machine-readable instructions that, when executed by a distributed computing system, cause the distributed computing system to:

responsive to a test for a motor vehicle using the distributed computing system, verifying whether the test complies with a reference hardware configuration for the distributed computing system and the test complies with a reference software configuration for the distributed computing system, wherein the distributed computing system comprises an in-vehicle processing system of the motor vehicle and a second processing system external to the motor vehicle, wherein the distributed computing system comprises a plurality of hardware components and a plurality of software components, wherein the plurality of hardware components comprises first hardware components of the in-vehicle processing system-and second hardware components of the second processing system, wherein the plurality of software components comprises first software components of the in-vehicle processing system and second software components of the second processing system, and wherein the verifying comprises:

determining integrity measurements of the first hardware components, the second hardware components, the first software components and the second software components, wherein the determining the integrity measurements comprises applying a cryptographic hash function to a value associated with at least one of the first hardware components, the second hardware components, the first software components and the second software components to derive a hash corresponding to a given integrity measurement of the integrity measurements; and comparing, by the distributed computing system, the integrity measurements to reference measurements corresponding to the reference hardware configuration and the reference software configuration; and manage the test responsive to a result of the verifying, wherein the managing comprises responsive to determining that the test complies with the reference hardware configuration and the reference software configuration, providing, by the distributed computing system, digitally signed data for audit records for the first hardware components, the second hardware components, the first software components and the second software components, and wherein the audit records attest to the distributed computing system having the reference hardware configuration and the reference software configuration in connection with the test, wherein providing the digitally signed data comprises encrypting a content corresponding to the integrity measurements with a cryptographic key to provide a digital signature corresponding to a given audit record of the audit records.

19. The storage medium of claim 18, wherein the instructions, when executed by the distributed computing system, further cause the distributed computing system to generate audit data for the given audit record representing events occurring in the distributed computing system during the test.

20. The storage medium of claim 18, wherein the instructions, when executed by the distributed computing system, further cause the distributed computing system to, responsive to the test, generate digitally signed data for the given audit record representing a reference to a description of the reference hardware configuration and a reference to the reference software configuration.

21. The storage medium of claim 18, wherein the instructions, when executed by the machine, further cause the machine to responsive to determining that the test complies with the reference hardware configuration and the reference software configuration, allow the test.

* * * * *